Aug. 7, 1923.

C. OSBORN

COMBINED WHEEL AND AIR TANK

Filed Aug. 12, 1922

1,464,441

Inventor.
Clyde Osborn
by Victor J. Evans
Attorney.

Patented Aug. 7, 1923.

1,464,441

UNITED STATES PATENT OFFICE.

CLYDE OSBORN, OF MILO, CALIFORNIA.

COMBINED WHEEL AND AIR TANK.

Application filed August 12, 1922. Serial No. 581,421.

*To all whom it may concern:*

Be it known that I, CLYDE OSBORN, a citizen of the United States, residing at Milo, in the county of Tulare and State of California, have invented new and useful Improvements in Combined Wheel and Air Tanks, of which the following is a specification.

This invention relates to means for supplying air under compression to automobile tires and has for its principal object the utilization of the disc wheel of a motor vehicle as a source of supply for air.

Another object of this invention is to store the air in the various wheels of the automobile and to provide means for readily transferring the air to any tire on the vehicle, that may be partly deflated.

A further object of this invention is to provide means for readily having access to the tank for connecting a tube that will transfer the air supply from the tank to a deflated wheel.

Other objects and advantages will be apparent during the course of the following description.

Figure 1:
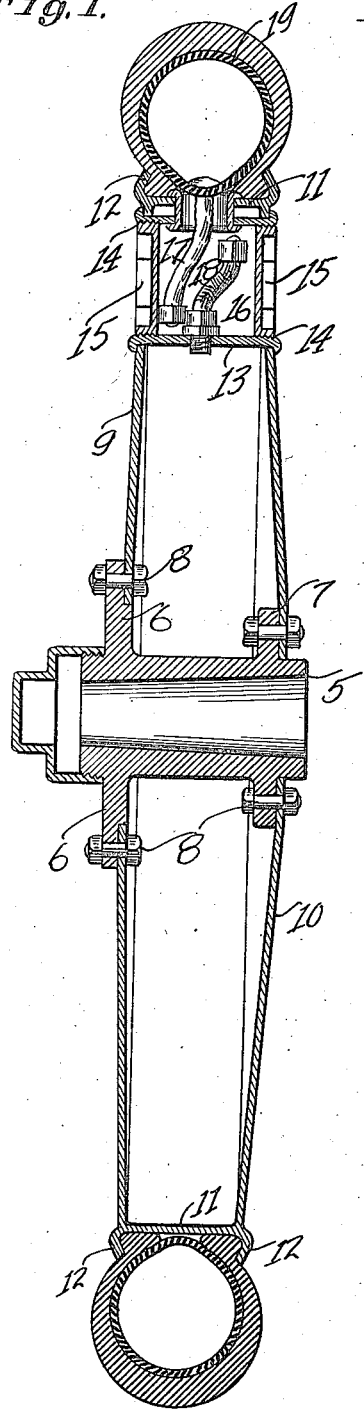
Figure 2:
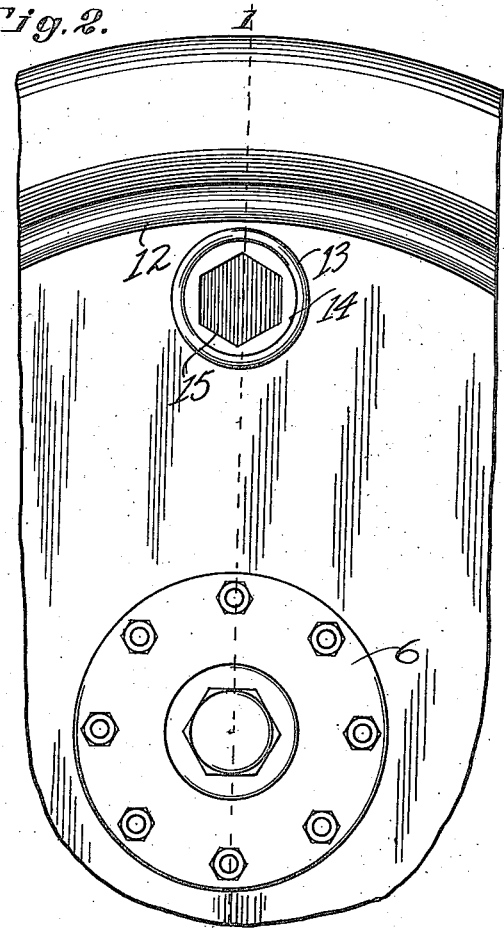
Figure 3:
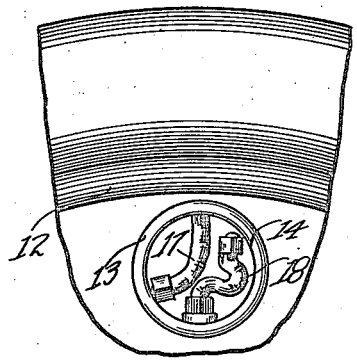

In the accompanying drawings forming a part of this specification, and in which like numerals are employed to designate like parts throughout the same, Figure 1 is a tranverse central section of my improved device, the view being taken on the line 1—1 of Figure 2, Figure 2 is an enlarged side elevation partly broken away of a portion of the tire and wheel, and Figure 3 is a side elevation of the tire and wheel partly broken away and disclosing to advantage the means whereby access is had to the interior of the tank.

It is a well known fact that when a tire has been either entirely deflated or partly deflated, due to a puncture or slow leak, it is necessary for the operator to employ a pump for filling the deflated tire. In the use of hand operated pumps the filling of a tire requires time taking, laborious work. In order to eliminate this disadvantage and to provide the trade with a combined air supply tank and wheel, I have devised my invention so that when a road trip is being taken the occupants of the car will always have a supply of air on hand in the respective wheels, so that the said supply can be transferred to any of the tires that may become deflated.

In the accompanying drawings wherein for the purpose of illustration is shown a preferred embodiment of my invention, the numeral 5 designates a wheel hub provided with annular flanges 6 and 7. To these flanges I propose to secure by fastening elements 8, steel disc plates 9 and 10. These plates are joined so as to provide a tread receiving member 11 which is equipped with inwardly bent flanges 12 adapted to retain therein a pneumatic tire casing. By making the wheel structure in this manner an air tight tank will be provided.

In order to have access to the interior of the wheel, I propose to insert between the two plates at a predetermined point an annular sleeve 13 which is internally threaded as at 14, so as to detachably receive wrench engaging caps 15.

The sleeve is preferably welded to the discs 9 and 10 and forms an auxiliary chamber 16 so as to retain therein flexible tubes 17 and 18. The tube 17 serves as an inlet to the inner tube 19, while the flexible tube 18 serves as an inlet and outlet for the tank formed by the steel plates 9 and 10, and in which tank there is stored the supply of air.

It is to be understood that these tubes 17 and 18 are supplied with the usual needle valves or similar means for making a ready connection and consequent transfer of the supply of air. While but one wheel structure is shown, it is to be noted that each wheel is equipped as above described. In transferring the supply of air from the various wheels a length of hose of conventional type and conventionally equipped is to be used.

From the foregoing description taken in connection with the accompanying drawing it will be evident that I have devised a unique storage means for air whereby the air can not only be transferred from the wheel proper to the tire carried on the wheel, but also can be transferred from one wheel or tank supply to any tire, for instance, from a rear wheel to a front wheel, from the left front wheel to the right front wheel, from the left rear wheel to the right rear wheel, or in other words universally changeable.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, the combination with a vehicle wheel hub, of a supply tank secured to said hub and serving as a part of the wheel structure and adapted to retain a pneumatic tire thereon, and means for permitting access to said tank, substantially as and for the purpose described.

2. A wheel for storing air therein, comprising disc plates secured to the wheel hub, a tread seating member formed integral with and co-operating with said plates and hub to form an air tank, said tread seating member adapted to receive thereon a pneumatic tire, and means for supplying and withdrawing the supply of air from said tank and for withdrawing and supplying the air to said tire.

3. A wheel for storing air therein comprising a hub provided with annular flanges, disc plates secured at their inner extremities to the flanges of the hub, a tread seating member formed on the opposite extremity of said disc plates and co-operating with said hub and plates to form a tank, said tread seating member adapted to receive thereon a pneumatic tire, and means formed in said plates for permitting access to the supply of air in said tank.

4. A wheel for storing air therein comprising a hub provided with annular flanges, disc plates secured at their inner extremities to the flanges of the hub, a tread seating member formed on the opposite extremity of said disc plates and co-operating with said hub and plates to form a tank, said tread seating member adapted to receive thereon a pneumatic tire, and means formed in said plates for permitting access to the supply of air in said tank, said means comprising a sleeve brazed to said disc plates and forming an auxiliary chamber, and inlet and outlet valves positioned in said chamber and connected to said tank and tire, for the purpose specified.

In testimony whereof I affix my signature.

CLYDE OSBORN.